(12) United States Patent
Parikh et al.

(10) Patent No.: US 10,339,251 B2
(45) Date of Patent: *Jul. 2, 2019

(54) METHOD TO IMPROVE TRANSISTOR MATCHING

(71) Applicant: Texas Instruments Incorporated, Dallas, TX (US)

(72) Inventors: Ashesh Parikh, Frisco, TX (US); Chi-Chien Ho, Plano, TX (US); Thomas John Smelko, Richardson, TX (US); Rajni J. Aggarwal, Garland, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,016

(22) Filed: Apr. 24, 2017

(65) Prior Publication Data

US 2017/0228488 A1    Aug. 10, 2017

Related U.S. Application Data

(63) Continuation of application No. 14/563,361, filed on Dec. 8, 2014, now Pat. No. 9,665,675.

(60) Provisional application No. 61/922,191, filed on Dec. 31, 2013.

(51) Int. Cl.
*G06F 17/50* (2006.01)
*H01L 21/66* (2006.01)
*H01L 21/8234* (2006.01)

(52) U.S. Cl.
CPC ...... *G06F 17/5072* (2013.01); *G06F 17/5036* (2013.01); *G06F 17/5045* (2013.01); *G06F 17/5063* (2013.01); *G06F 17/5068* (2013.01); *H01L 21/823456* (2013.01); *H01L 22/34* (2013.01); *G06F 2217/12* (2013.01); *H01L 22/20* (2013.01); *Y02P 90/265* (2015.11)

(58) Field of Classification Search
CPC ............ G06F 17/5045; G06F 17/5063; G06F 17/5068; G06F 2217/12; H01L 21/823456; H01L 22/20; H01L 22/34; Y02P 90/265
See application file for complete search history.

(56) References Cited

U.S. PATENT DOCUMENTS

| | | | |
|---|---|---|---|
| 7,032,194 B1 | 4/2006 | Hsueh et al. | |
| 9,665,675 B2 * | 5/2017 | Parikh | H01L 22/34 |
| 2012/0117519 A1 * | 5/2012 | Parikh | G06F 17/5036 |
| | | | 716/53 |
| 2012/0204134 A1 * | 8/2012 | Topaloglu | H01L 27/0207 |
| | | | 716/52 |

FOREIGN PATENT DOCUMENTS

CN        101675348 A      3/2010

* cited by examiner

*Primary Examiner* — Vuthe Siek
(74) *Attorney, Agent, or Firm* — Jacqueline J. Garner; Charles A. Brill; Frank D. Cimino

(57) ABSTRACT

A method to adjust transistor gate geometries in a design data base to compensate for transistor-to-transistor active overlap of gate differences and to form a reticle. A method to adjust transistor geometries in a design data base to compensate for transistor-to-transistor active overlap of gate differences and to compensate for transistor turn on voltage drop off where the transistor gate crosses the isolation/active interface.

11 Claims, 3 Drawing Sheets

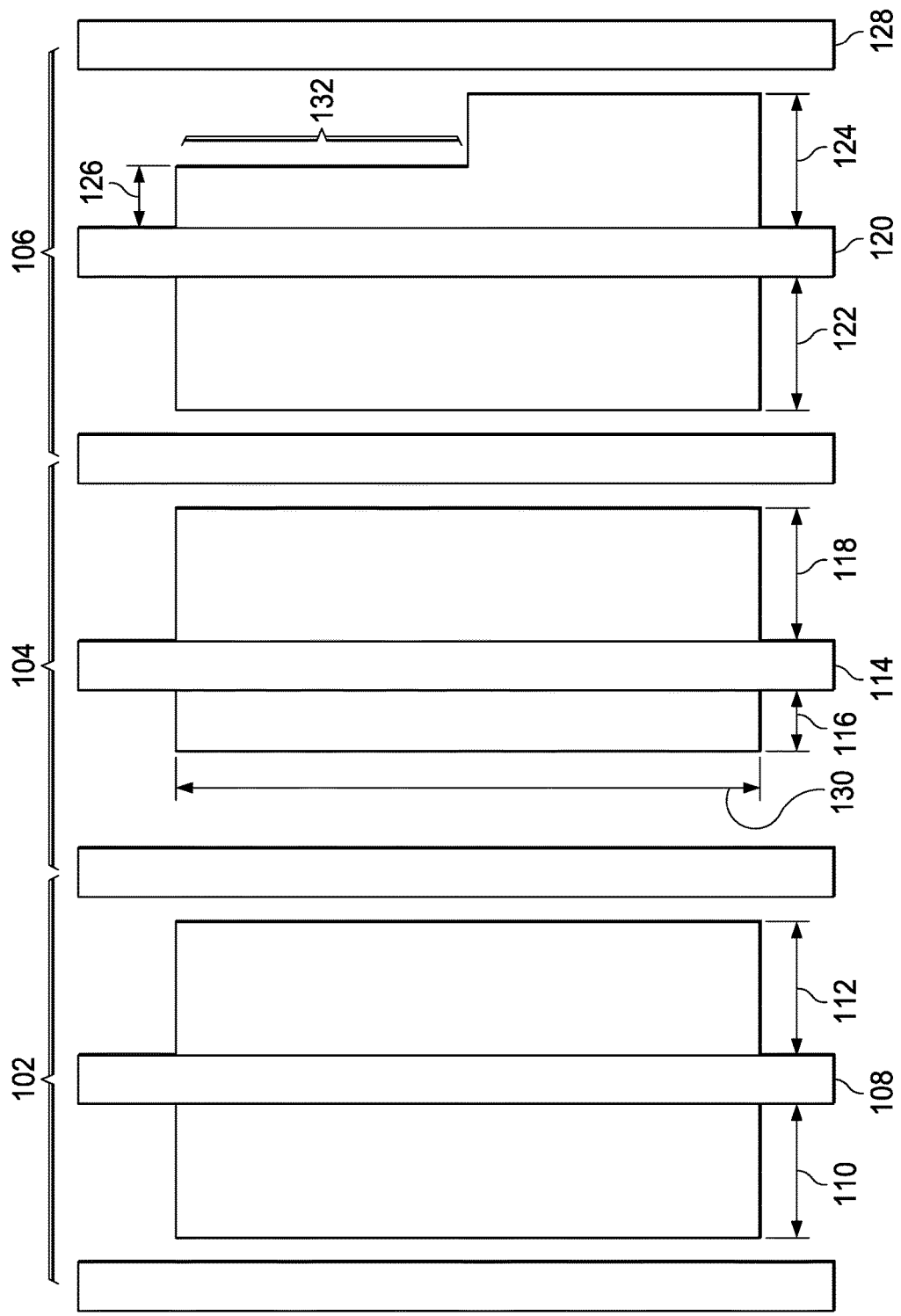

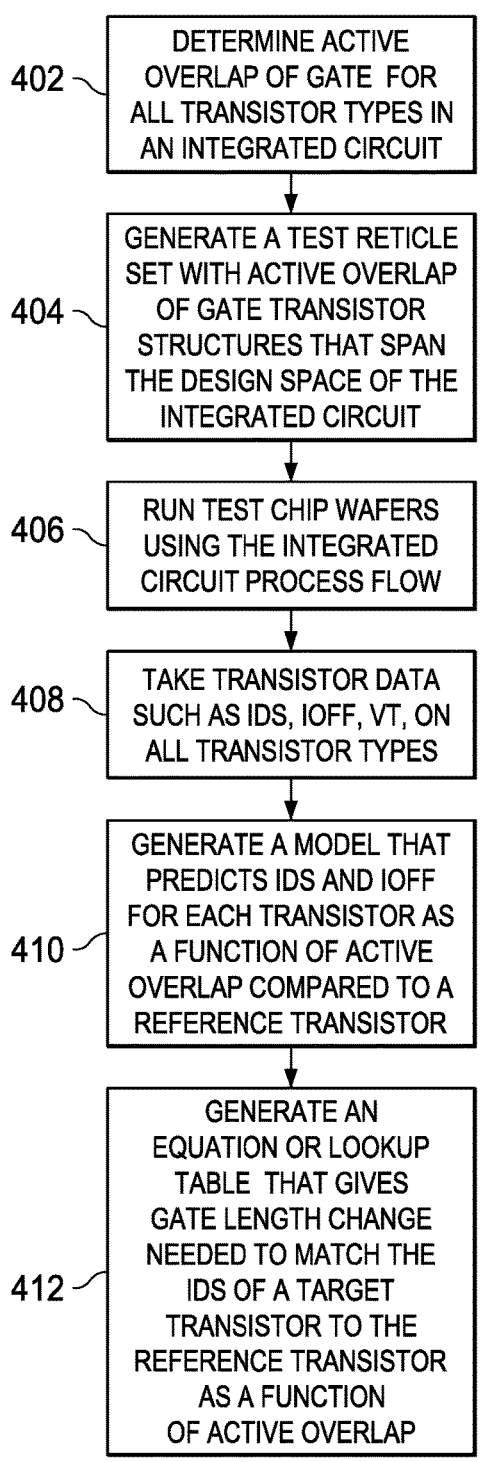
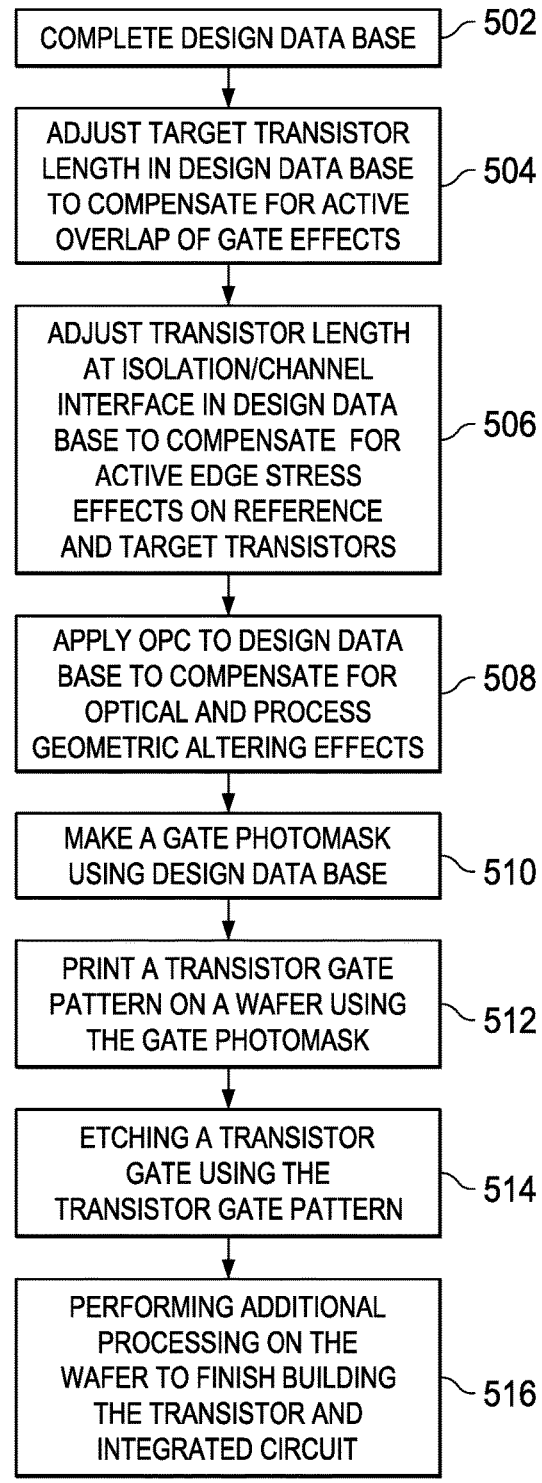
FIG. 4
FIG. 5

METHOD TO IMPROVE TRANSISTOR MATCHING

CROSS-REFERENCE TO RELATED APPLICATIONS

This application is a continuation of U.S. Nonprovisional patent application Ser. No. 14/563,361, filed Dec. 8, 2014, which claims the benefit of of U.S. Provisional Application Ser. No. 61/922,191, filed Dec. 31, 2013, the contents of both of which are herein incorporated by reference in its entirety.

FIELD OF THE INVENTION

This invention relates to the field of integrated circuits. More particularly, this invention relates to reducing transistor-to-transistor variability.

BACKGROUND OF THE INVENTION

Stress imposed on the channel of transistors is used to enhance transistor performance. For example, stress memorization techniques are used to impose tensile stress on the NMOS transistor channel to enhance NMOS transistor performance and silicon-germanium replacement source and drains are used to impose compressive stress on the PMOS transistor channel to enhance PMOS transistor performance.

Variation in stress imposed on the transistor channel transistor-to-transistor causes variation in the drive current (Ids) transistor-to-transistor. One source of variation in stress is active overlap of the transistor gate. Variation in the active overlap of the transistor gate transistor-to-transistor results in variation in the drive current transistor-to-transistor. Typically designers loosen their transistor design margins so that the integrated circuit can operate properly in spite of the stress induces transistor-to-transistor mismatch in the drive current. Loosening transistor design margins may result in a reduction in performance of the integrated circuit.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to a more detailed description that is presented later.

A method to adjust transistor gate geometries in a design data base to compensate for differences in transistor-to-transistor drive current caused by differences in active overlap of gate and to form a reticle is disclosed A method to adjust transistor geometries in a design data base to compensate for differences in transistor-to-transistor drive current caused by differences in active overlap of gate and to compensate for transistor turn on voltage drop off where the transistor gate crosses the isolation/active interface is disclosed.

DESCRIPTION OF THE VIEWS OF THE DRAWING

FIG. 1 illustrates transistors with the same gate length and transistor width but with transistor-to-transistor active overlap of gate differences.

FIG. 4 is a flow diagram of steps for determining drive current versus active overlap of gate according to embodiments.

FIG. 5 is a flow diagram of steps in the fabrication of integrated circuits formed according to embodiments.

DETAILED DESCRIPTION OF EXAMPLE EMBODIMENTS

Figure 3:
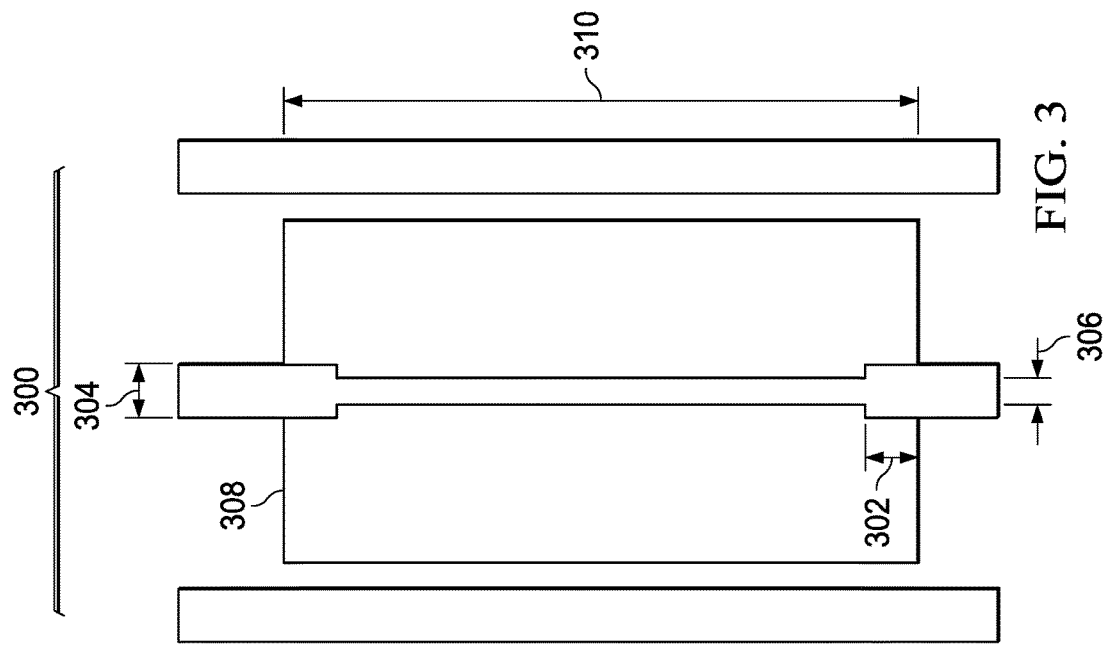
FIG. 3 A transistor formed according to embodiments

The following co-pending patent application is related and hereby incorporated by reference: U.S. patent application Ser. No. 13/288,584, filed Nov. 3, 2011. With its mention in this section, this patent application is not admitted to be prior art with respect to the present invention.

The present invention is described with reference to the attached figures, wherein like reference numerals are used throughout the figures to designate similar or equivalent elements. The figures are not drawn to scale and they are provided merely to illustrate the invention. Several aspects of the invention are described below with reference to example applications for illustration. It should be understood that numerous specific details, relationships, and methods are set forth to provide an understanding of the invention. One skilled in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Variation in the active overlap of gate from one transistor to another transistor may result in differences in drive current between the transistors. Typically designers relax transistor design margins to enable the circuit to function properly in the presence of these drive current variation. Designing with larger design margins may reduce circuit performance and reduce the yield of parts with acceptable performance.

Although all three transistors 102, 104, and 106 in FIG. 1 have the same gate length and same transistor width 130, the transistor drive currents (Ids) may differ significantly due to differences in stress in the channel region due to differences in the active overlap of gate. For example, in reference transistor 102 the active overlaps 110 and 112, of gate 108 are the same whereas in transistor 104, the active overlaps 116 and 118, of gate 114 are different. The drive current of transistor 104 may be different that the drive current of reference transistor 102 due to the different stress imposed on the transistor channels. The gate length of transistor 114 may be adjusted across the width 130 of the transistor channel so that the drive current of transistor 104 becomes matched to the drive current of reference transistor 102.

In transistor 106, the active overlaps 122 and 124 of gate 120 in the lower portion of transistor 106 are the same as reference transistor 102 but the active overlap 126 of gate 120 in the upper portion of transistor 106 is different.

Figure 2:
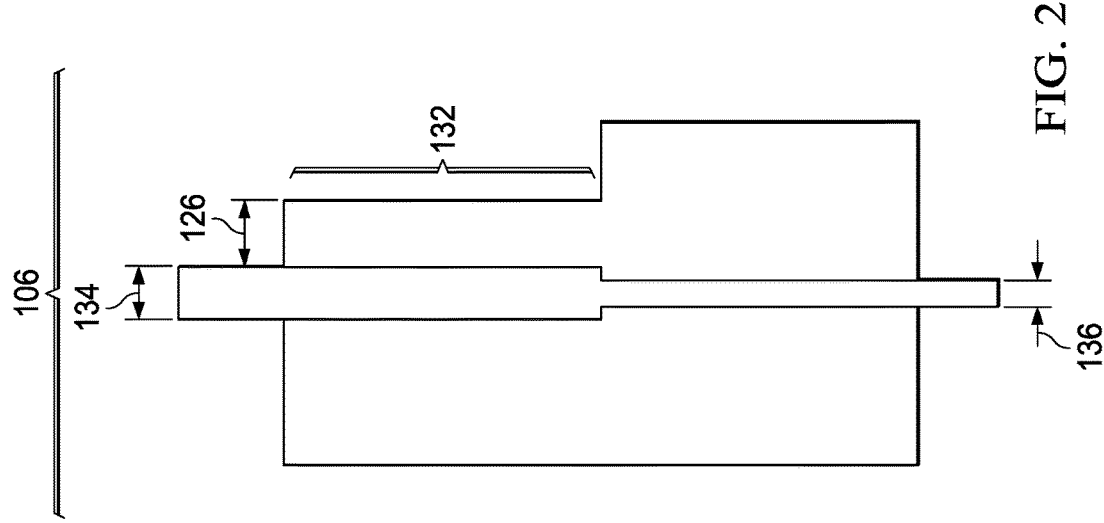
FIG. 2 A transistor formed according to embodiments

As shown in FIG. 2, the gate length 134 of the upper portion 132 of transistor 106 may be adjusted separately from the gate length 136 of the lower portion of transistor 106 to match the drive current to that of reference transistor 102.

In the design layout in FIG. 1, the transistor gates 108, 114, and 120 are placed at constant pitch along with dummy gates 128 to improve transistor-to-transistor matching.

The Ids of PMOS transistors with SiGe source/drains are especially sensitive to stress differences due to differences in active overlap of gate. In the SiGe source/drain process, single crystal silicon is removed from the source and drain areas to form trenches and these trenches are then refilled with epitaxially grown SiGe. Since the lattice constant of SiGe is larger than the lattice constant of single crystal silicon compressive stress is applied to the single crystal in the transistor channel region. This compressive stress enhances the hole mobility and therefore raises enhances the PMOS Ids. Larger SiGe active overlaps of PMOS gates apply larger compressive stress to the PMOS channel region resulting in higher PMOS Ids. Variation in SiGe active overlap of PMOS gate from one transistor to another results in PMOS Ids variability.

NMOS and PMOS transistor test structures with active overlap of gate that span the active overlap of gate design space for an integrated circuit may be used to construct lookup tables of Ids versus active overlap of gate or may be used to generate an equation that calculates Ids as a function of the active overlap of gate. For PMOS transistors lookup tables may be constructed for SiGe active overlap of gate and also for non SiGe active overlap of gate if both types of PMOS transistors are present in the design data base. These lookup tables may be used to make adjustments to the PMOS transistors prior to OPC to reduce PMOS transistor-to-transistor Ids variability. With reduced transistor-to-transistor Ids variability, design margins may be reduced which may improve circuit performance and improve circuit yield.

The term "reference transistor" refers to a transistor with a given transistor gate length, transistor width, and active overlap of gate. Preferably the reference transistor is the transistor that is used most often in the design database. A different reference transistor may be defined for each transistor type, for each different transistor width and for each different transistor gate length if desired.

Another source of transistor-to-transistor variability is the change in transistor turn on voltage (vt) where the transistor gate traverses the active/isolation boundary. The vt of especially NMOS transistors is reduced by about 5 to 50 my in the channel region immediately adjacent to the isolation as compressive stress from the isolation dielectric ranges from about 0.5 to 1.5 GPa. This reduction in vt increases the drive current of the transistor but also may raise the transistor off current (Ioff) resulting in unacceptably high standby current.

FIG. 3 illustrates an embodiment method of reducing transistor variation due to this stress proximity effect. The gate length 304 of the transistor 300 is lengthened into the channel region 302 where the gate crosses the isolation/active boundary 308. The gate length 304 of a transistor with nominal leakage may be lengthened by about 10% for a distance 302 of less than about 20% (10% per side) of the channel width 310 per side into the channel. Increasing the gate length into the channel by more than about 20% may result in an unacceptable decrease in transistor performance. In a first example embodiment transistor with nominal leakage (gate length of about 50 nm or less) with dimensions of 40 nm by 150 nm, the transistor the gate length 304 may be increased to 44 nm extending a distance 302 of about 15 nm per side (about 10% per side) into the channel The gate length of a low-leakage gate length transistor (gate length of about 80 nm or more) may be increased in length by about 10% for a distance of less than about 35% (17.5% per side) of the channel. The gate length of an example embodiment low-leakage transistor with dimension of 110 nm by 150 nm is increased from 110 nm to about 130 nm extending about 25 nm per side (16.7%) into the channel.

FIG. 4 is an example process flow for determining what adjustment (as a function of active overlap of gate) may be made to the gate length of a transistor to match drive current to the drive current of a reference transistor.

In step 402, the design database of an integrated circuit is examined to determine all variations of active overlap of gate for each transistor type in the integrated circuit.

In step 404 a test chip reticle set is generated with transistors with variation in active overlap of transistor gate which spans the integrated circuit transistor design space.

In step 406 the test chip transistors are fabricated using the process flow that is used to manufacture the integrated circuit.

In step 408 transistor data such as Ids, Ioff, and vt are taken on each transistor type. This data is used to build a model in step 410 which predicts Ids per unit transistor width as a function of active overlap of gate for each transistor type.

In step 412 the model generated in step 410 may be used to generate either an equation or a look up table of what change to gate length as a function of active overlap of gate may be made to match the Ids of a transistor to a reference transistor. Typically the reference transistor is chosen to be the transistor with the active overlap used most often in the circuit.

FIG. 5 is an example process flow for implementation. After the designers complete the design data base 502 for an integrated circuit, in step 404 the design database 502 may be loaded into a computer and a software program run to select transistors (target transistors) with an active overlap of gate that differs from a reference transistor. This program may use a subroutine or lookup table such as is generated in step 412 of FIG. 4 to determine what change may be made to the gate length of target transistor gate to match the Ids of the target transistor to the Ids of the reference transistor.

In step 506, the transistor gate length of target and reference transistors may be adjusted where the transistor gate crosses the isolation/active boundary to compensate for stress effects that might unacceptably increase transistor Ioff.

In step 508, an OPC program may be run on the design data base to correct for optical and process induced geometric effects.

In step 510 a gate photo mask may be formed using the design data base that is corrected for Ids variability and for OPC.

In step 512, a gate pattern may be printed in photoresist on a wafer during the manufacture of an integrated circuit.

In step 514 a transistor gate may be formed by etching gate material using the photoresist gate pattern.

In step 512 additional processing including forming source and drain extensions, source and drain diffusions, and contacts to the source and drain and gate of the transistor to finish building the transistor and the integrated circuit While various embodiments of the present invention have been described above, it should be understood that they have been presented by way of example only and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

What is claimed is:

1. A process of forming an integrated circuit, comprising the steps:
- selecting a target transistor in a design data base of the integrated circuit with a target transistor active overlap of gate that is different than a reference active overlap of gate of a reference transistor;
- determining a target transistor gate length change that will match a drive current of the target transistor with a drive current of the reference transistor;
- applying the target transistor gate length change to the gate of the target transistor in the design data base, wherein the target gate length change occurs to only a portion of the gate, the portion located where the target transistor gate crosses a boundary between isolation and active of the transistor; and
- fabricating the transistor with the target transistor gate length change on a semiconductor wafer.

2. The process of claim 1, wherein the step of determining comprises using a calibrated SPICE program to determine the target transistor gate length change.

3. The process of claim 2, wherein the SPICE program is calibrated using data from a set of transistors with active overlap of gate variation that spans a transistor design space of transistors used in the integrated circuit.

4. The process of claim 1, wherein the step of determining comprises using a lookup table to determine the target transistor gate length change.

5. The process of claim 4, wherein the lookup table is generated using data from a set of transistors with active overlap of gate variation that spans a transistor design space of transistors used in the integrated circuit.

6. The process of claim 1, further comprising a target transistor with a first gate region with a first active overlap of gate and a second gate region with a second active overlap of gate and where a first target gate change is applied to the first gate region and a second target gate change is applied to the second gate region.

7. A process of designing an integrated circuit, comprising the steps:
- selecting a target transistor in a design data base of the integrated circuit with a target transistor active overlap of gate that is different than a reference active overlap of gate of a reference transistor;
- determining a target transistor gate length change that will match a drive current of the target transistor with a drive current of the reference transistor;
- applying the target transistor gate length change to the gate of the target transistor in the design data base, wherein the target gate length change occurs to only a portion of the gate, the portion located where the target transistor gate crosses a boundary between isolation and active of the transistor; and
- having a gate photomask generated with the target transistor gate length change for forming the target transistor on a semiconductor wafer.

8. The process of claim 7, wherein the step of determining comprises using a calibrated SPICE program to determine the target transistor gate length change.

9. The process of claim 8, wherein the SPICE program is calibrated using data from a set of transistors with active overlap of gate variation that spans a transistor design space of transistors used in the integrated circuit.

10. The process of claim 7, wherein the step of determining comprises using a lookup table to determine the target transistor gate length change.

11. The process of claim 10, wherein the lookup table is generated using data from a set of transistors with active overlap of gate variation that spans a transistor design space of transistors used in the integrated circuit.

* * * * *